United States Patent
Heindl et al.

(10) Patent No.: US 9,441,679 B2
(45) Date of Patent: Sep. 13, 2016

(54) SYNCHRONISED SHIFT DEVICE FOR A VEHICLE

(71) Applicant: AGCO International GmbH, Hesston, KS (US)

(72) Inventors: Richard Heindl, Marktoberdorf (DE); Florian Knobloch, Marktoberdorf (DE)

(73) Assignee: AGCO INTERNATIONAL GmbH, Neuhausen (CH)

( * ) Notice: Subject to any disclaimer, the term of this patent is extended or adjusted under 35 U.S.C. 154(b) by 0 days.

(21) Appl. No.: 14/438,794

(22) PCT Filed: Nov. 5, 2013

(86) PCT No.: PCT/EP2013/072983
§ 371 (c)(1),
(2) Date: Apr. 27, 2015

(87) PCT Pub. No.: WO2014/095147
PCT Pub. Date: Jun. 26, 2014

(65) Prior Publication Data
US 2015/0300422 A1 Oct. 22, 2015

(30) Foreign Application Priority Data
Dec. 21, 2012 (GB) .................................. 1223545.3

(51) Int. Cl.
*F16D 23/06* (2006.01)
*F16H 47/04* (2006.01)
*B60K 17/28* (2006.01)
(Continued)

(52) U.S. Cl.
CPC .............. *F16D 23/06* (2013.01); *B60K 6/365* (2013.01); *B60K 6/387* (2013.01); *B60K 17/28* (2013.01); *F16D 21/06* (2013.01); *F16H 47/04* (2013.01); *B60K 17/344* (2013.01); *F16D 21/02* (2013.01); *F16D 2023/0631* (2013.01);
(Continued)

(58) Field of Classification Search
CPC ........ F16D 23/06; F16D 21/06; F16D 21/02; F16D 2023/0631; B60K 6/365; B60K 6/387; B60K 17/28; B60K 17/344; F16H 47/04; F16H 2037/0873; F16H 2200/2005; Y10S 903/902
See application file for complete search history.

(56) References Cited

U.S. PATENT DOCUMENTS

| 4,270,639 A | 6/1981 | Johnsson |
| 4,782,929 A | 11/1988 | Muller |

(Continued)

FOREIGN PATENT DOCUMENTS

DE    3208944 A1    9/1983

OTHER PUBLICATIONS

Intellectual Property Office, International Search Report for UK Patent Application No. GB1223545.3, dated Sep. 16, 2013.
(Continued)

*Primary Examiner* — Darlene Condra

(57) ABSTRACT

A synchronized shift device for locked connection of at least two shafts (30, 32), which shafts have different rotation speeds at the start of a shift procedure. An arrangement of first annular drive body (36), synchronization body (42) and first annular coupling element (44) bring about synchronization of the shaft speed prior to coupling by a synchronization sleeve (50). A further shaft (60), coaxially arranged, may be provided with a similar arrangement of annular drive body (62) and coupling element (66) for synchronized connection with one of the other shafts (32).

13 Claims, 7 Drawing Sheets

(51) Int. Cl.
    *B60K 6/365*     (2007.10)
    *B60K 6/387*     (2007.10)
    *F16D 21/06*     (2006.01)
    *F16D 21/02*     (2006.01)
    *B60K 17/344*     (2006.01)
    *F16H 37/08*     (2006.01)

(52) U.S. Cl.
    CPC ............... *F16H 2037/0873* (2013.01); *F16H 2200/2005* (2013.01); *Y10S 903/902* (2013.01)

(56) References Cited

U.S. PATENT DOCUMENTS

| | | | | |
|---|---|---|---|---|
| 5,156,577 | A * | 10/1992 | Fredriksen | F16H 47/04 475/74 |
| 5,199,704 | A * | 4/1993 | Badami | A63D 15/006 273/120 R |
| 5,311,787 | A * | 5/1994 | Wilson | B60K 17/28 180/247 |
| 5,499,951 | A * | 3/1996 | Showalter | B60K 17/3467 475/204 |
| 2006/0101932 | A1 * | 5/2006 | McCrary | F16H 61/32 74/329 |
| 2007/0289835 | A1 * | 12/2007 | Hatori | F16D 23/06 192/53.34 |
| 2010/0173746 | A1 * | 7/2010 | Ideshio | B60K 6/365 477/36 |
| 2011/0111910 | A1 * | 5/2011 | Ideshio | B60K 6/36 475/5 |
| 2011/0167957 | A1 | 7/2011 | Kato | |
| 2012/0042743 | A1 * | 2/2012 | Hunold | B60K 17/28 74/335 |
| 2012/0060632 | A1 | 3/2012 | Appelshaeuser | |
| 2013/0239718 | A1 * | 9/2013 | Asada | F16D 23/06 74/339 |
| 2014/0326093 | A1 * | 11/2014 | Martin | F16D 11/10 74/331 |

OTHER PUBLICATIONS

European Receiving Office, International Search Report for International Patent Application No. PCT/EP2013/072983, date of mailing Jan. 7, 2014.

* cited by examiner

SYNCHRONISED SHIFT DEVICE FOR A VEHICLE

BACKGROUND OF THE INVENTION

1. Field of Invention

The invention relates to shifting means for achieving locked connection of at least two shafts whereby the shafts have different rotation speeds at the start of a shift procedure, and also to the use of such shifting means in power takeoff (PTO) and other drive systems for utility vehicles and, in particular, for agricultural tractors.

2. Description of Related Art

For many years agricultural tractors have been fitted with PTO systems which allow the transfer of torque from the prime mover to an attached implement. Examples of implements that utilise PTO systems include balers, fertilizer spreaders, seed drills and hedge cutters to name but a few.

Some implements, tillage implements for example, are power hungry and place a constant high load upon the PTO typically operating at the nominal engine speed to deliver the optimum efficiency. Other implements such as fertilizers spreaders place a low load upon the PTO but still demand the maximum speed. The demanded PTO speed dictates the speed at which the engine must be run due to the direct mechanical connection between the engine and the output PTO stub. In the case of low load at applications this results in excessive fuel consumption and noise.

Some implements demand a constant ratio between the groundspeed and the PTO speed. Some tractors provide a groundspeed PTO mode wherein the propulsion drive to the wheels is directly coupled by meshed gears to the PTO stub. The ratio between groundspeed and PTO speed in such a mode is fixed by the gears installed during manufacture and the size of tyre fitted.

Where a groundspeed PTO mode is provided, problems may occur when switching between groundspeed and engine speed.

It is an object of the invention to provide a mechanism for switching of coaxial shafts in applications such as a PTO drive system for a utility vehicle such as an agricultural tractor which at least alleviates some the aforementioned problems.

OVERVIEW OF THE INVENTION

In accordance with a first aspect of the invention there is provided a synchronised shift device for locked connection of at least two shafts whereby the shafts have different rotation speeds at the start of a shift procedure, comprising:

a. a first shaft;
b. a first annular drive body coaxially and fixedly mounted on the first shaft and having a plurality of teeth on a radial outer surface thereof;
c. a synchronisation body rotatably mounted on the first shaft adjacent the first annular body;
d. a first annular coupling element rotatably mounted relative to the first annular drive body and driveably engageable therewith, said coupling element having a plurality of teeth on a radial outer surface thereof;
e. a synchronisation sleeve disposed about the first annular drive body, synchronisation body and first annular coupling element, the sleeve having teeth on an inner surface thereof and being slidable in an axial direction of the first shaft from a first disengaged position, through an intermediate position wherein the teeth of the sleeve engage the teeth of the first annular coupling element and thereby drive engagement of the first annular coupling element and first annular drive body, to an engaged position wherein the teeth of the sleeve engage the teeth of the drive body;
f. a second shaft having external gearing over a part of the length thereof, said external gearing being in driving engagement with gearing on a part of the inner surface of the synchronisation sleeve in all positions of the synchronisation sleeve;
g. a third shaft coaxially and rotatably disposed about the first shaft;
h. a second annular drive body coaxially and fixedly mounted on the third shaft adjacent the synchronisation body and having a plurality of teeth on a radial outer surface thereof; and
i. a second annular coupling element rotatably mounted relative to the second annular drive body and driveably engageable therewith, said second annular coupling element having a plurality of teeth on a radial outer surface thereof;

wherein the synchronisation sleeve is slidable through a second intermediate position wherein the teeth of the sleeve engage the teeth of the second annular coupling element and thereby drive engagement of the second annular coupling element and second annular drive body, to a second engaged position wherein the teeth of the sleeve engage the teeth of the second annular drive body.

Through this arrangement, where the driven engagement of the first annular coupling element and first annular drive body (suitably through friction surfaces) causes the rotation speeds of the first and second shafts to synchronise before the teeth of the sleeve engage the teeth of the drive body. In the engaged position of the sleeve, torque is transmitted through the first annular drive body and coupling element, thereby avoiding strain on the synchronisation body.

With this arrangement permitting selective synchronised connection between the second shaft and either of the first and third shafts, a number of applications of the device to driveline arrangements are facilitated, some examples of which are described below.

BRIEF DESCRIPTION OF THE DRAWINGS

Embodiments of the present invention will now be described by way of example only, and with reference to the accompanying drawings, in which.

DETAILED DESCRIPTION OF THE INVENTION

Figure 1:
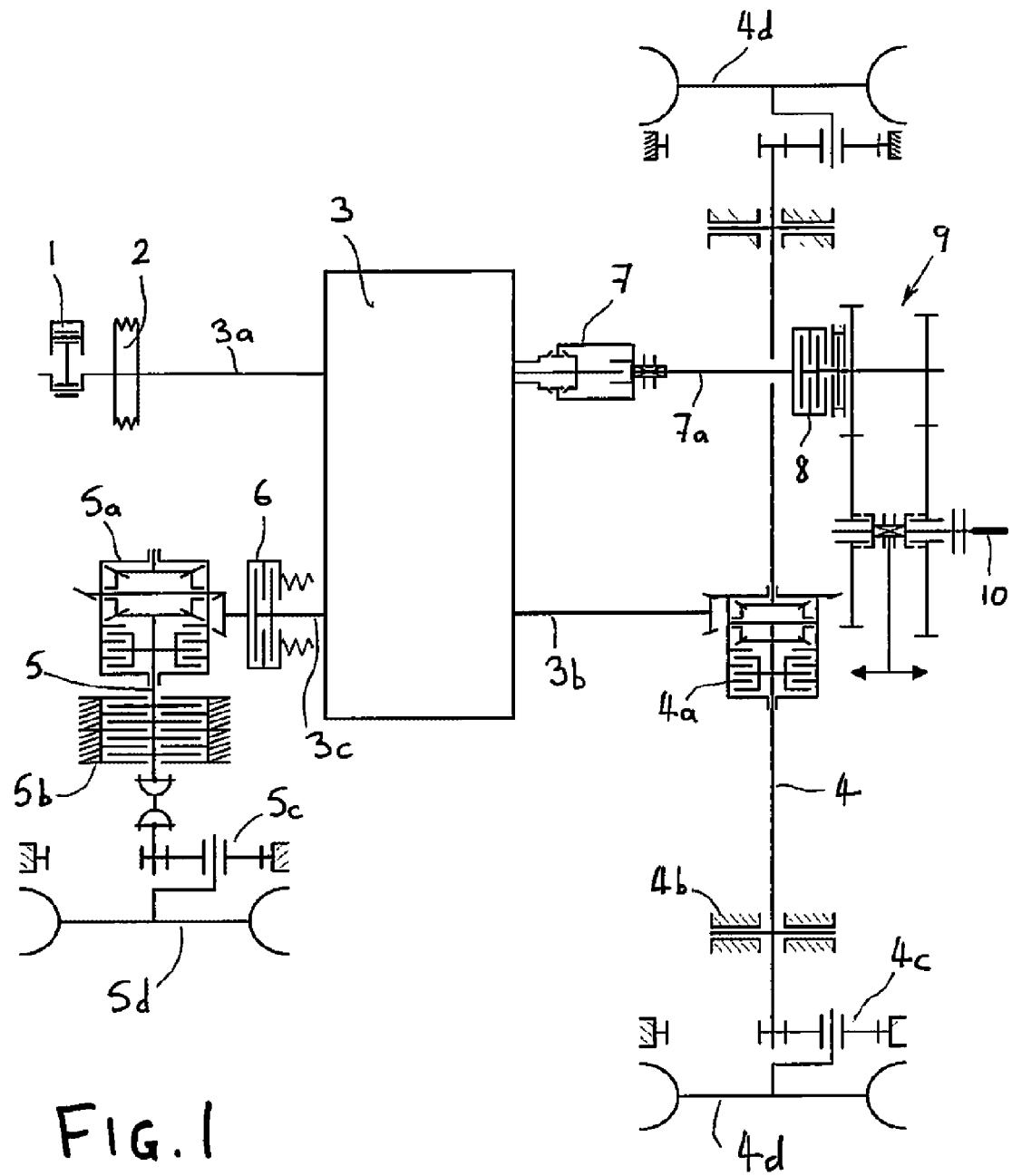
FIG. 1 shows a first configuration of utility vehicle driveline including means for driving a PTO shaft including a synchronised shift device embodying the invention.

Beginning with the driveline arrangement of FIG. 1, a prime mover such as an internal combustion engine 1 drives an input shaft 3a of a gearbox/transmission unit 3 via flywheel 2. The transmission unit 3 may be configured to adapt gear ratios in a stepped or continuously variable mode to drive first 3*b* and second 3*c* output shafts.

Output shaft 3*b* drives the vehicle rear axle 4 via rear axle differential 4*a*. The rear axle assembly further comprises rear axle brakes 4*b*, rear axle final drives 4*c*, and rear wheels 4*d*. In like manner, output shaft 3*c* drives the vehicle front axle 5, with the front axle assembly further comprising differential 5*a*, brakes 5*b*, final drive 5*c* and front wheels 5*d*. Between the output shaft 3*c* and front axle differential 5*a* there is provided an all-wheel drive (AWD) clutch mechanism 6 by operation of which the drive to the vehicle front wheels may be selectively engaged or disengaged.

Also connected to the transmission 3 is a synchronised shift device 7 operable to couple an output shaft 7*a* thereof with either the input shaft 3*a* or an output of the transmission in dependence on whether engine speed or groundspeed PTO operation is required. Further details of the construction and operation of shift device 7 are given below with reference to the embodiment of FIGS. 3 and 4.

Via clutch assembly 8 and PTO gearbox 9, the synchronised shift device output shaft 7*a* drives the PTO shaft 10.

Figure 2:
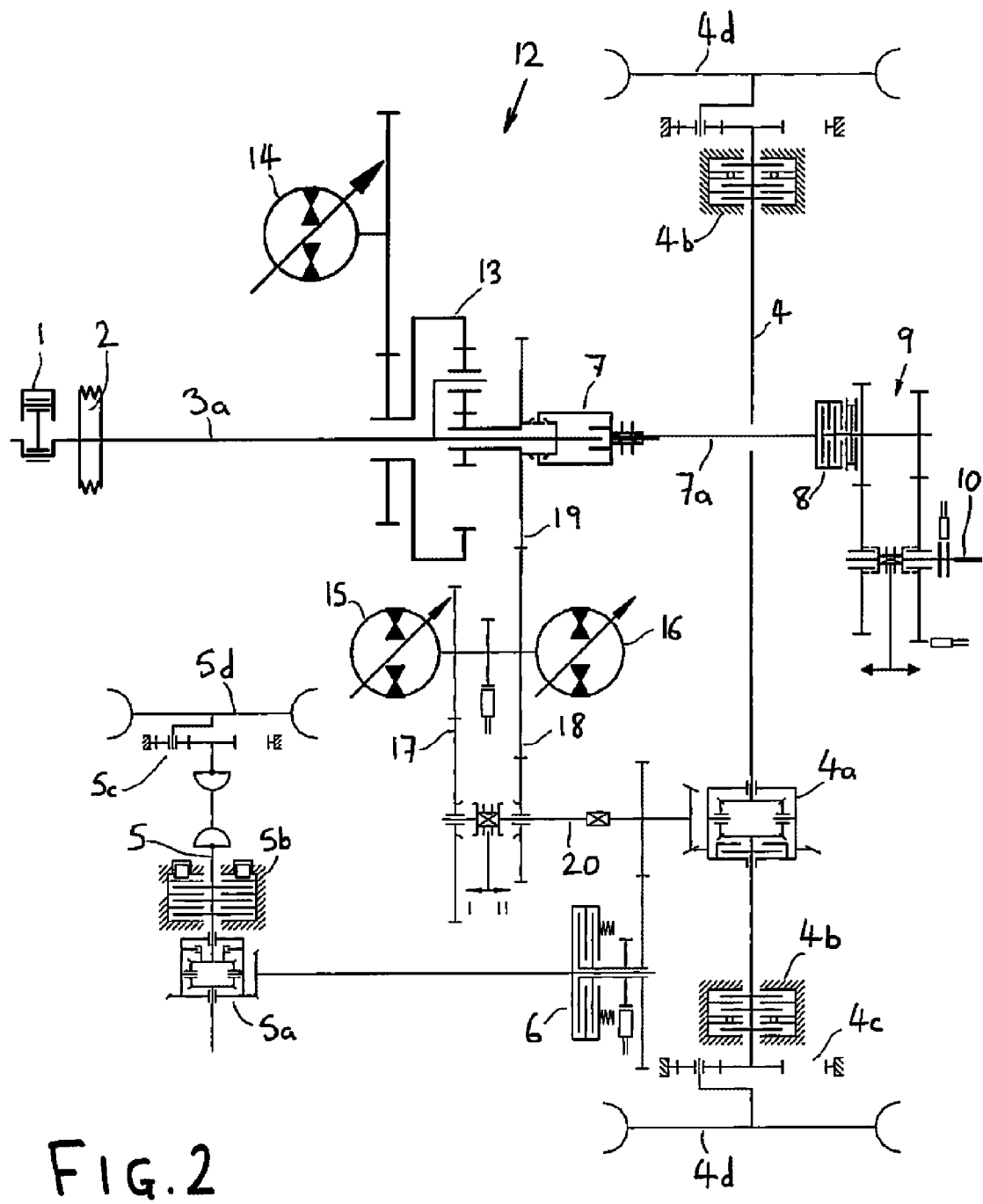
FIG. 2 shows a further configuration of utility vehicle driveline having a power split transmission arrangement.

FIG. 2 shows an alternative driveline arrangement having a power split transmission arrangement (indicated generally at 12) in place of the transmission 3 of FIG. 1. Planetary or epicyclic gearing 13 separates the torque delivered by the engine 1 for mechanical and hydrostatic branches, with the hydrostatic branch including a pump 14 driven via the planetary gearing 13. In turn, the pump 14 supplies pressurised fluid to first and second hydrostatic motors 15, 16 (the fluid connection is omitted for reasons of clarity). Through gearing 17, 18 the hydrostatic motors 15, 16 drive an output shaft 20 delivering driving torque to both front 5*a* and rear 4*a* axle differentials.

The synchronised shift device 7 is operable to selectively connect its output shaft 7*a* to one of the transmission input shaft 3*a* (for engine speed PTO operation) or transmission output body or shaft 20, via gearing 18, 19 (for ground speed operation). As schematically shown, the synchronised shift device comprises inner and outer coaxially aligned and respectively rotatable input bodies alternately connectable to the shift device output shaft, with the inner input body connected to the transmission input (engine output) shaft and the outer input body or shaft driveably connected to the transmission output.

Figure 3:
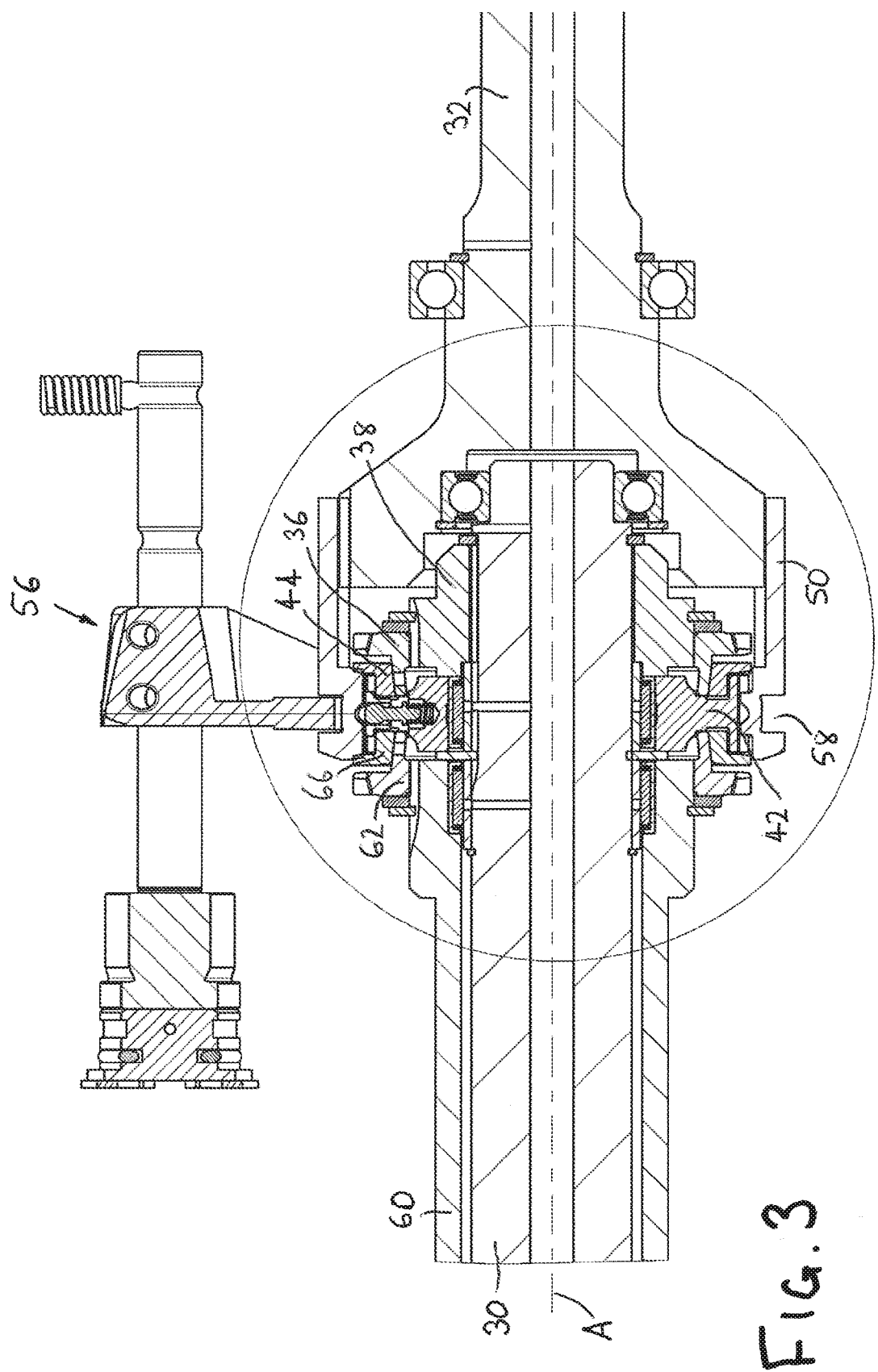
FIG. 3 shows in sectional view an embodiment of the synchronised shift device of the invention for use in the driveline configurations of FIG. 1 or 2.
Figure 4:
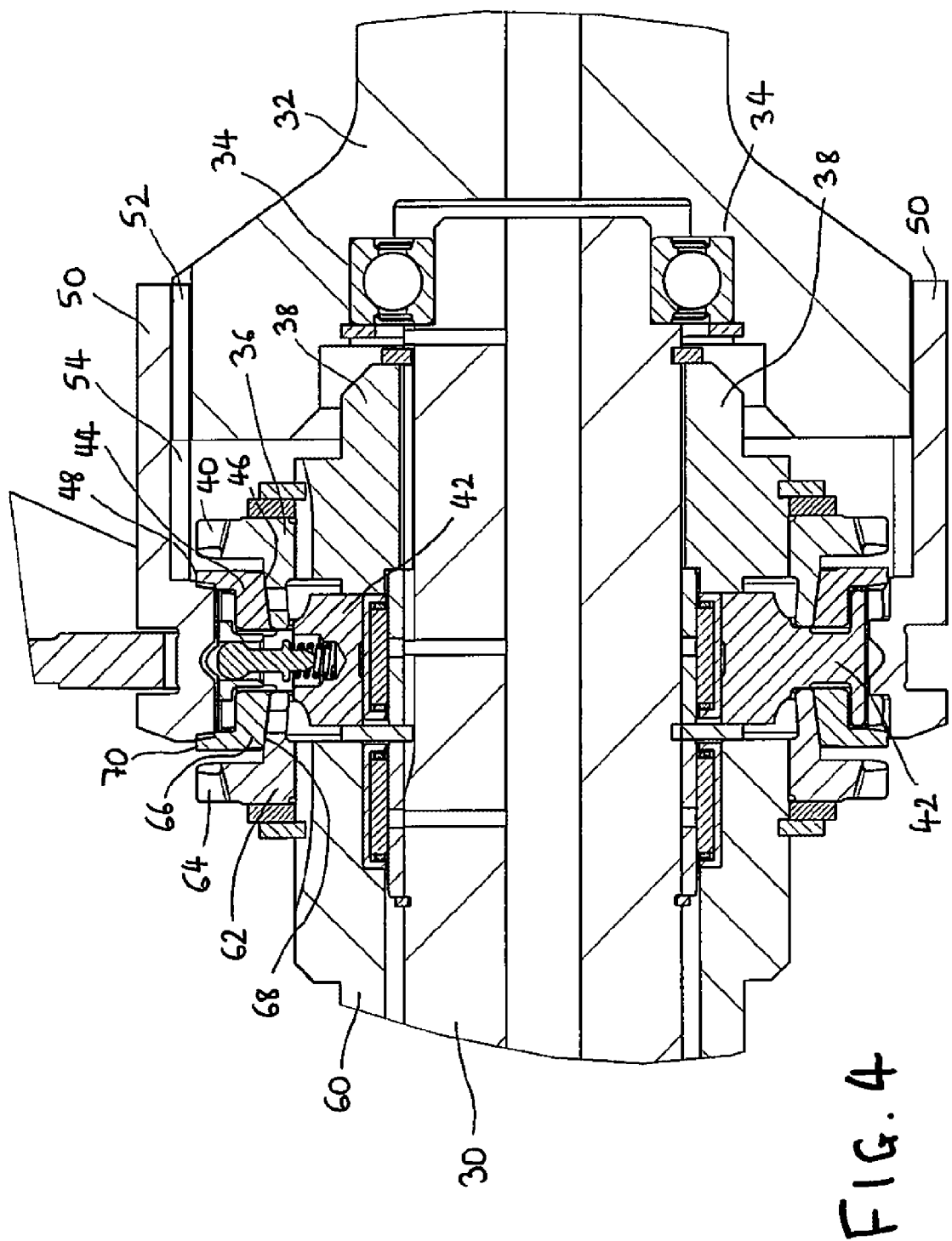
FIG. 4 is an enlargement of part of the view of FIG. 3.

FIGS. 3 and 4 show an embodiment of the shift device which comprises a first input shaft 30 axially aligned with, and connectable to (in a manner to be described), an output shaft 32. Bearings 34 support an end of the input shaft 30 within a recessed end portion of the output shaft 32 and permit the two shafts to rotate relative to one another and about the common axis A.

A first annular drive body 36, 38 is coaxially and fixedly mounted on the first input shaft 30 and has a plurality of teeth 40 on a radial outer surface thereof. A synchronisation body 42 is rotatably mounted on the first input shaft 30 adjacent the first annular drive body 36, 38. A first annular coupling element 44 is rotatably mounted relative to the first annular drive body and driveably engageable therewith through respective friction surfaces 46. The coupling element 44 has a plurality of teeth 48 on a radial outer surface thereof.

A synchronisation sleeve 50 is disposed about the first annular drive body 36, 38, synchronisation body 42 and first annular coupling element 44, the sleeve having teeth on an inner surface thereof and being slidable in an axial direction of the first input shaft from a first disengaged position (as shown), through an intermediate position wherein the teeth of the sleeve engage the teeth 48 of the first annular coupling element 44 and thereby drive engagement of the first annular coupling element and first annular drive body, to an engaged position wherein the teeth of the sleeve engage the teeth 40 of the first annular drive body.

The second shaft 32 has external gearing 52 over a part of the length thereof, which external gearing remains in driving engagement with gearing 54 on a part of the inner surface of the synchronisation sleeve in all positions of the synchronisation sleeve. As shown generally at 56 in FIG. 3, a control mechanism engages with a recess 58 in the outer surface of the sleeve 50 to control the movement of the sleeve from disengaged to engaged positions.

In operation, as the sleeve 50 is moved to an intermediate position, the engagement of the friction surfaces between the first annular drive body 36 and first annular coupling element 44 cause the coupling element 44 and sleeve 50 (and thereby also the output shaft 32) to commence rotation at the same speed as the first annular drive body 36 and first input shaft 30 before full engagement by the teeth 40 of the first annular drive body 36 with the sleeve 50.

Providing a third torque connection to the unit, a third shaft 60 (used here as a second input) coaxially and rotatably disposed about the first shaft 30. A second annular drive body 62 is coaxially and fixedly mounted on the third shaft 60 adjacent the synchronisation body 42 and, as for the first annular drive body, it has a plurality of teeth 64 on a radial outer surface thereof. A second annular coupling element 66 is rotatably mounted relative to the second annular drive body 62 and is driveably engageable therewith through friction surfaces 68. The second annular coupling element 66 has a plurality of teeth 70 on a radial outer surface thereof.

In like manner to the connection of the first shaft 30, the synchronisation sleeve 50 is slidable (to the left as it appears in the Figure) through a second intermediate position wherein the teeth of the sleeve engage the teeth 70 of the second annular coupling element 66 and thereby drive engagement of the second annular coupling element 66 and second annular drive body 62 through friction surfaces 68, to a second engaged position wherein the teeth of the sleeve engage the teeth 64 of the second annular drive body. As before, the rotation speeds of the third shaft 60 and output shaft 32 are synchronised before the coupling engagement of teeth 64 and sleeve 50.

In use in the drivelines of FIGS. 1 and 2, the first shaft 30 is connected directly to the engine output/transmission input shaft 3*a* whilst the third shaft 60 is driveably connected (for example through gearing 18, 19) to the transmission output. In this way, the unit 7 provides a synchronised shift for the PTO shaft between engine speed and groundspeed operation.

Figure 5:
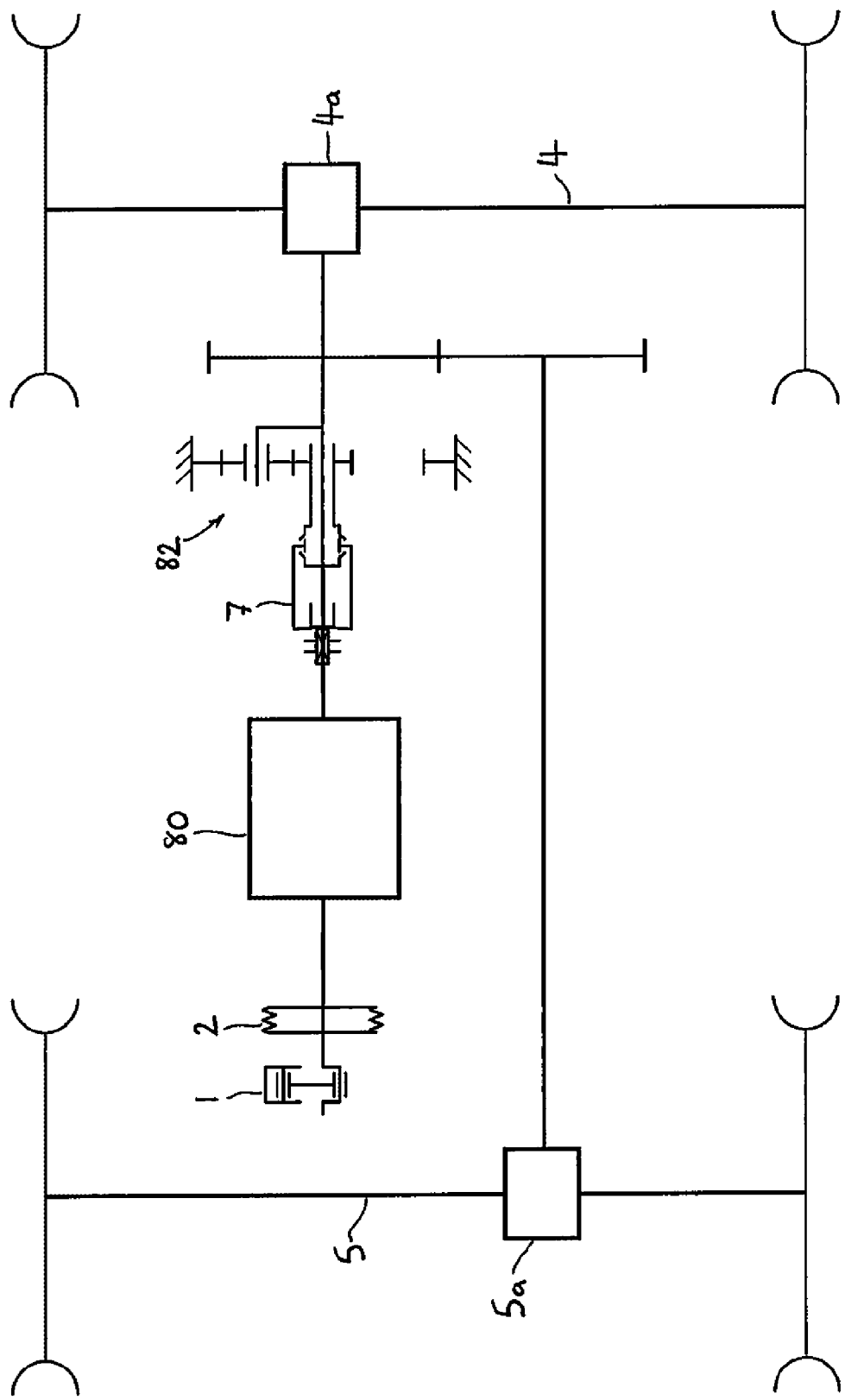
FIGS. 5 to 7 schematically represent further driveline applications of the synchronised shift device of FIGS. 3 and 4.
Figure 6:
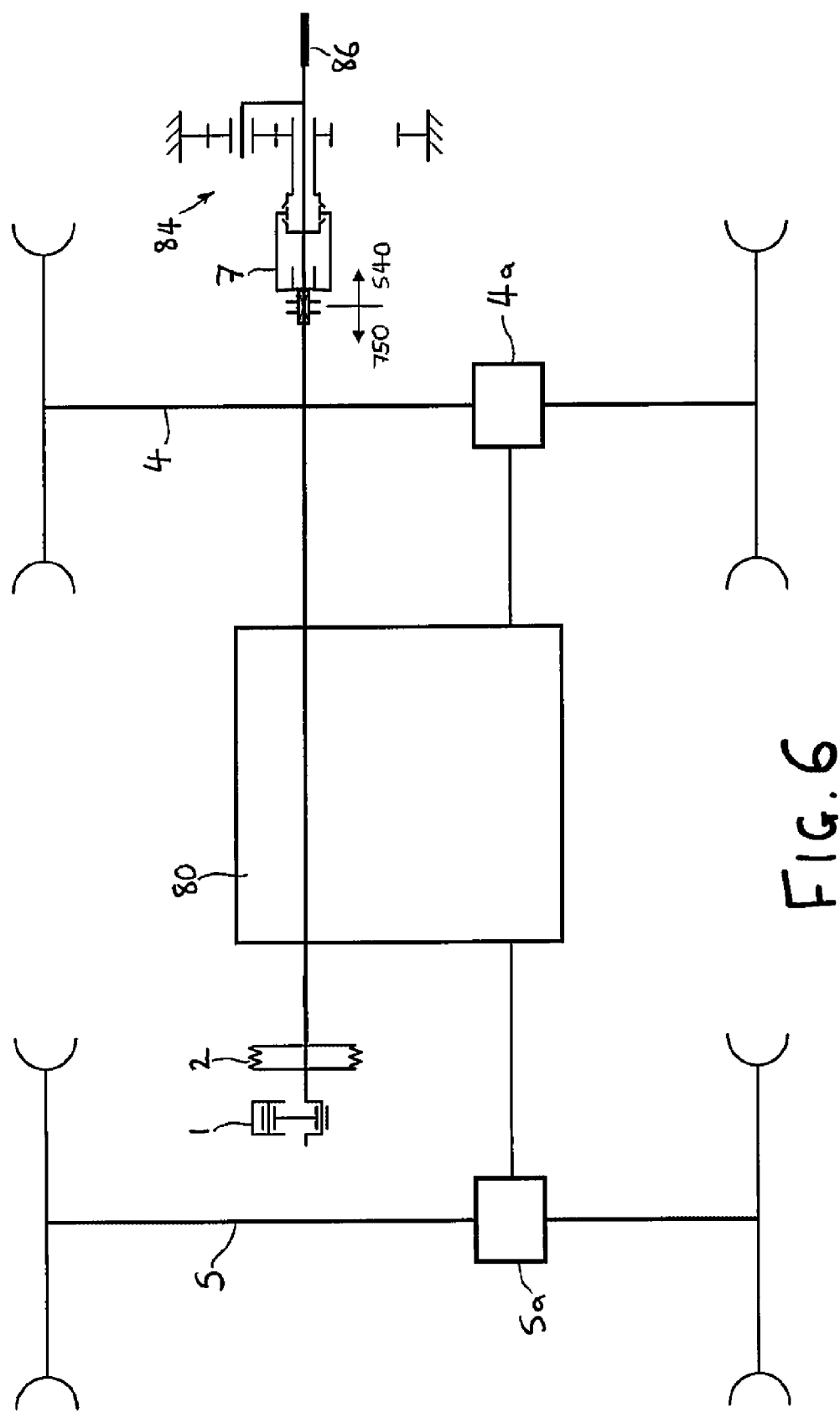
Figure 7:
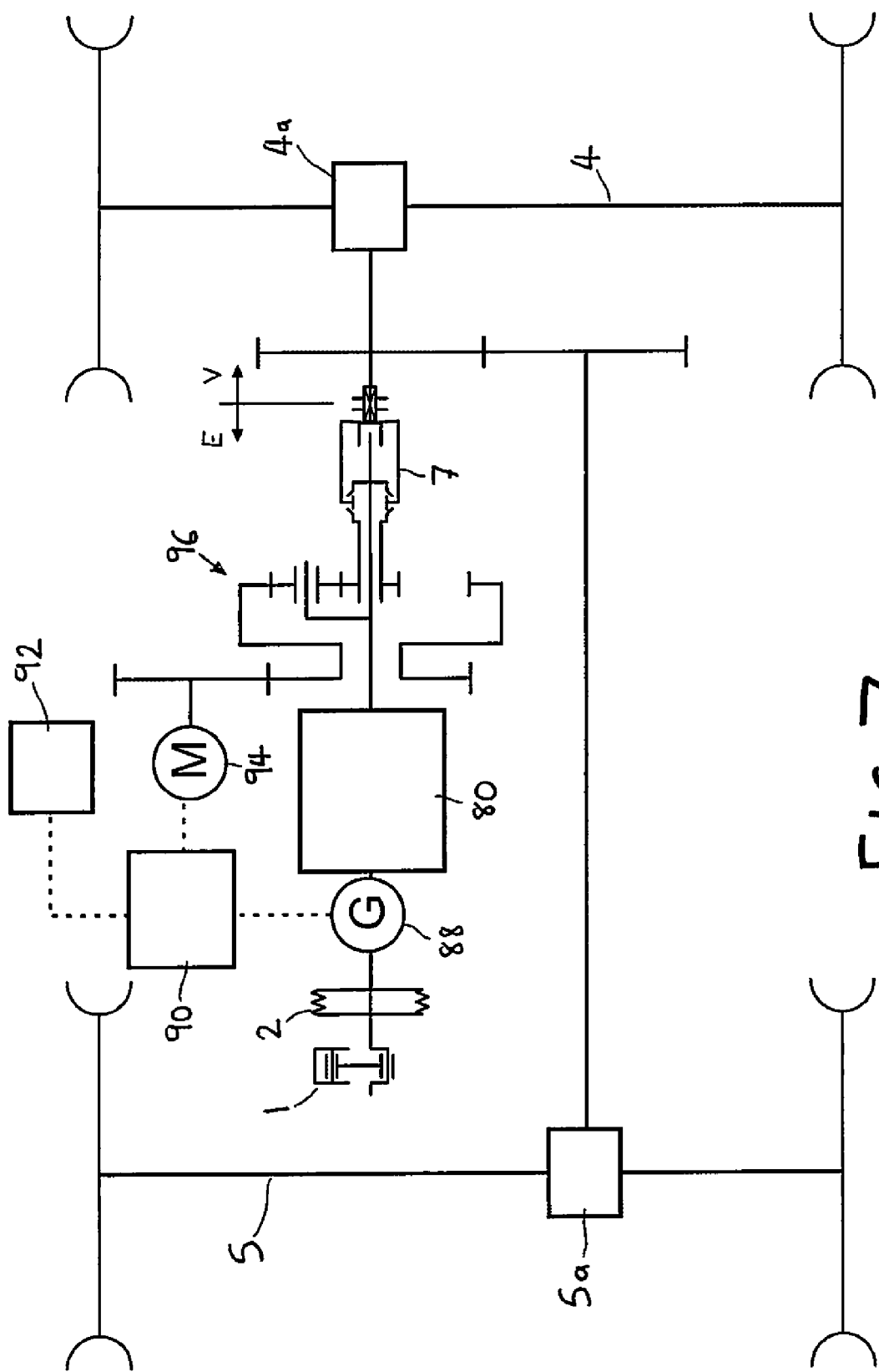

It will be recognised that the synchronised shift unit of FIGS. 3 and 4 has application beyond switching for PTO drive. For example, the shaft 32 may be coupled to a torque source with the shafts 30, 60 providing alternative outputs. FIGS. 5 to 7 show exemplary alternative uses for the shift device.

In FIG. 5, the device 7 is employed for engaging a crawl speed mode for vehicle operation. Engine 1 drives front 5 and rear 4 axles through shift gearbox 80 and via respective differentials 5*a*, 4*a*. The synchronised shift unit 7 is positioned in the driveline behind the gearbox 80 and is used to switch in or out planetary reduction gear 82 for slow or normal speed operation.

In FIG. 6, the device 7 is used for synchronised shifting between two rotation speeds (such as 750 rpm and 540 rpm)

of an engine speed PTO by switching in or out planetary reduction gear 84 in the line between engine 1 and PTO shaft 86.

In FIG. 7, the device is used for synchronised shifting between drive modes in a parallel-hybrid drivetrain. The combustion engine 1 provides an input to both shift gearbox 80 and to electrical generator 88. The generator 88, through power electronics circuitry 90 and storage battery 92, drives electric motor 94. The shift gearbox 80 output provides a first input to the device 7, suitably via inner input shaft 30 (FIG. 3). The second input to the device 7, suitably on outer input shaft 60 (FIG. 3), coupled via planetary gearing 96 is from the electric motor 94. The shift device 7 thereby enables synchronised shifting between electric E and combustion engine V drive modes with the output from shift device 7 driving front and rear axles 5, 4 via respective differentials 5a, 4a.

In the foregoing the applicants have described a synchronised shift device for locked connection of at least two shafts, which shafts have different rotation speeds at the start of a shift procedure. An arrangement of first annular drive body, synchronisation body and first annular coupling element bring about synchronisation of the shaft speed prior to coupling by a synchronisation sleeve. A further shaft, coaxially arranged, may be provided with a similar arrangement of annular drive body and coupling element for synchronised connection with one of the other shafts. Various applications of the device to vehicle drivelines are also described.

From reading of the present disclosure, other modifications will be apparent to those skilled in the art and the scope of the invention is limited only by the following claims.

The invention claimed is:

1. A synchronised shift device for locked connection of at least two shafts whereby the shafts have different rotation speeds at the start of a shift procedure, comprising:
   a. a first shaft;
   b. a first annular drive body coaxially and fixedly mounted on the first shaft and having a plurality of teeth on a radial outer surface thereof;
   c. a synchronisation body rotatably mounted on the first shaft adjacent the first annular body;
   d. a first annular coupling element rotatably mounted relative to the first annular drive body and driveably engageable therewith, said coupling element having a plurality of teeth on a radial outer surface thereof;
   e. a synchronisation sleeve disposed about the first annular drive body, synchronisation body and first annular coupling element, the sleeve having teeth on an inner surface thereof and being slidable in an axial direction of the first shaft from a first disengaged position, through an intermediate position wherein the teeth of the sleeve engage the teeth of the first annular coupling element and thereby drive engagement of the first annular coupling element and first annular drive body, to an engaged position wherein the teeth of the sleeve engage the teeth of the drive body;
   f. a second shaft having external gearing over a part of the length thereof, said external gearing being in driving engagement with gearing on a part of the inner surface of the synchronisation sleeve in all positions of the synchronisation sleeve;
   g. a third shaft coaxially and rotatably disposed about the first shaft;
   h. a second annular drive body coaxially and fixedly mounted on the third shaft adjacent the synchronisation body and having a plurality of teeth on a radial outer surface thereof; and
   i. a second annular coupling element rotatably mounted relative to the second annular drive body and driveably engageable therewith, said second annular coupling element having a plurality of teeth on a radial outer surface thereof;

wherein the synchronisation sleeve is slidable through a second intermediate position wherein the teeth of the sleeve engage the teeth of the second annular coupling element and thereby drive engagement of the second annular coupling element and second annular drive body, to a second engaged position wherein the teeth of the sleeve engage the teeth of the second annular drive body.

2. A synchronised shift device as claimed in claim 1, wherein the first and second shafts are axially aligned.

3. A synchronised shift device as claimed in claim 2, wherein an end portion of the first shaft is rotatably received in a recessed portion in an end portion of the second shaft.

4. A synchronised shift device as claimed in claim 1, wherein the engagement of said first annular drive body and said first annular coupling element, and the engagement of said second annular drive body and said second annular coupling element, is through respective first and second friction surfaces.

5. A synchronised shift device as claimed in claim 1, wherein the external gearing of the second shaft comprises a plurality of axially extending splines over a part of the length of the second shaft.

6. A transmission system including a synchronised shift device as claimed in claim 1.

7. A transmission system as claimed in claim 6, wherein the second shaft is an output shaft and the first and third shafts are input shafts.

8. A transmission system as claimed in claim 7, wherein the input shafts are connected to a transmission shaft and a planetary gear.

9. A transmission system as claimed in claim 8, wherein the planetary gear is driven from an electric motor and the transmission shaft is driven from a combustion engine.

10. A transmission system as claimed in claim 8, wherein the transmission shaft is a transmission input shaft or a transmission output shaft.

11. A transmission system as claimed in claim 6, wherein the second shaft is coupled to a torque source as an input shaft and the first and third shafts are alternative output shafts.

12. A transmission system as claimed in claim 11, wherein the output shafts are connected to at least one driven axle or a PTO shaft.

13. A transmission system as claimed in claim 11, wherein the output shafts connected to a transmission shaft and a planetary reduction gear.

* * * * *